Oct. 18, 1960     S. GOLDBERG     2,956,931

DISPENSING BIOLOGICAL MATERIALS

Filed Nov. 10, 1958

INVENTOR.
SIDNEY GOLDBERG
BY William Wolfe
ATTORNEY 2,956,931
Patented Oct. 18, 1960

2,956,931
DISPENSING BIOLOGICAL MATERIALS

Sidney Goldberg, 12—20 34th Ave.,
Long Island City 6, N.Y.

Filed Nov. 10, 1958, Ser. No. 773,057

8 Claims. (Cl. 195—103.5)

My invention relates to a means for dispensing biological materials in the field of laboratory testing and a method of antibiotic testing, phage typing and other testing.

Present day laboratory procedure subjects each specimen for analysis to many biological testing elements. These testing elements are dispensed individually by capillary pipettes upon each specimen being tested. This process or method of dispensing testing elements is a skilled manipulative task which is tedious and time consuming. In the present day method of testing no instrument other than a pipette is used.

I propose to make an instrument which will dispense simultaneously multiple biologicals and/or testing elements, and which instrument with its biologicals or testing elements in place can be used for a plurality of testing without addition or changing of the biologicals or testing elements. This instrument and method will eliminate the individual dispensing of biologicals or testing elements and provide a ready source of material for multiple testing.

An object of the invention is to provide for simple, quick and accurate multiple testing by means of dispensing multiple biologicals or other testing elements.

A further object is to provide a container having a plurality of receptacles for receiving different biologicals or testing elements and a dispensing element having a plurality of dispensing means correspondingly positioned to the receptacles so that when the dispensing element is functionally positioned in relation to the container, the dispensing means receives different biologicals from each receptacle, and then can be simply positioned to deposit the biologicals in a specified order upon an appropriate surface or Petri dish which surface or dish is later impregnated or coated with the specimen being tested.

Another object is to provide a container having a plurality of holes or wells and a dispensing element having a plurality of prongs correspondingly positioned to the holes or wells.

A further object is to provide a method for biological testing comprising (1) placing a plurality of different biologicals in a container, (2) dipping the prongs of a dispensing element into the container, then setting the dispensing element onto an appropriate surface which is later impregnated or coated with the specimen being tested.

I accomplish these objects by providing a container with multiple wells or holes and a co-acting base with multiple pins, prongs or projections, the said pins, prongs or projections correspondingly positioned to the wells so that when the co-acting base is positioned over the container, the pins, prongs or projections fit into the wells.

For further comprehension of the invention and of the objects and advantages thereof, reference will be had to the following description, the accompanying drawings and to the appended claims in which the various novel features of the invention are more particularly set forth.

In the accompanying drawings forming a material part of this disclosure:

Figure 1:
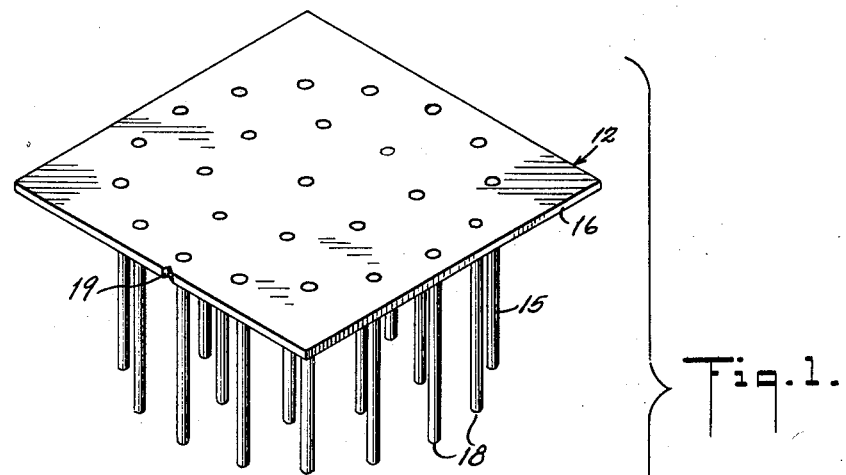
Figure 1 is an exploded perspective view of the invention.
Figure 3:
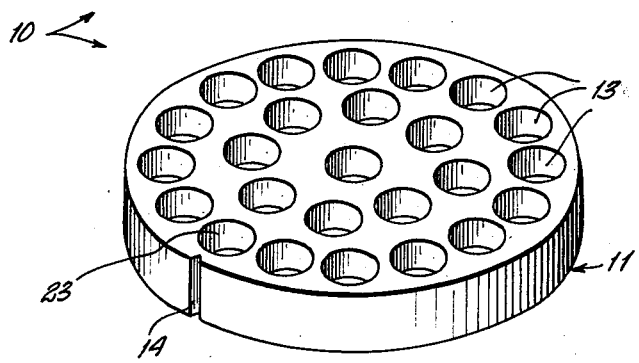
Figure 3 is a plan view of a surface containing the deposits received from the prongs.
Figure 2:
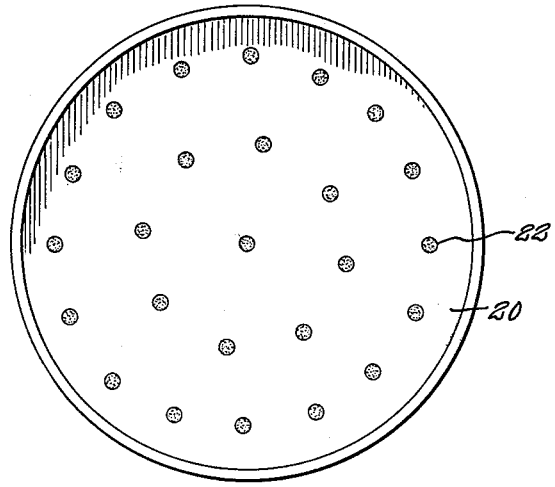
Figure 2 is a section detail of part of the invention.

In the drawings and in the specifications in which like numerals correspond to similar elements my testing device 10 is formed of a container 11 and a dispensing element 12. The container is provided with a plurality of wells or holes 13 and a V-shaped or other form of positional indicator 14 and the dispensing element 12 is provided with a plurality of prongs or pins 15 which are positioned correspondingly to the holes 13. The pins 15 are screwed into a base 16 in the dispensing element and nuts 17 are screwed into the pins. This is done so that the ends 18 of the pins can be adjusted to rest in the same plane. However the pins can be made integral with the base or can be secured in the base in any other suitable manner as long as the ends 18 of the pins are in the same plane. The base 12 is provided with a V-shaped or other form of positional indicator 19 so that the dispensing element 12 can be, each time, identically positioned with respect to the container.

A Petri dish or surface 20 is provided upon which the dispenser is positioned to deposit the biologicals or other testing materials that were picked up from the container 11.

Thus it can be seen that the present container 11 with 13 wells and the dispensing element 12 with 15 prongs can at one instant, prepare a surface or Petri dish 20 with 24 different biologicals or testing elements i.e. 22, and it further can be recognized that by redipping the prongs a second time into the wells and positioning the prongs on a second surface or Petri dish, etc. that second surface becomes equally well prepared for making 24 tests. Thus a great number of testing surfaces or Petri dishes can be quickly and easily prepared with a plurality of different biologicals, phages or other testing elements.

The dispenser functions in this manner. A dye is placed in one of the wells preferably well 23 of the container. The dye acts as a positional marker. Each biological phage or testing material to be used or tested is placed in an individual well of the container in a prearranged order. The co-acting dispensing element is placed over the container with the prongs of the dispensing element extending into the wells. Each prong or projection of the co-acting dispenser is in contact with a biological placed in the corresponding well of the container. When the co-acting dispenser is removed from the container the dye and the biologicals adhere to the surfaces of the pins or prongs. The dispenser is placed or positioned on an appropriate surface or testing area. This placement or positioning releases the dye and the biologicals simultaneously from the pins or prongs on to the appropriate surface or testing area.

The surface or testing area may be prepared to receive the biologicals by being coated with agar or any other suitable media. After the biologicals have been deposited upon the appropriately prepared surface the specimen to be tested is then deposited over the same area.

It should be recognized that the preceding two paragraphs define four steps in a process of testing substances. However heretofore no order of taking the steps has been laid out and no reference has been made to the incidental steps of drying the applications to the testing surface. It can readily be seen that the order of the steps can be varied considerably without detracting from the accuracy and the speed of the tests. A suggested order of steps is as follows: (1) depositing in a plurality of the wells of the container different testing biologicals, antibiotic or other testing bodies, (2) preparing a Petri dish or surface with agar or other growth media, (3) positioning the dispensing element with its prongs in the wells of the container, (4) taking the dispensing element from the container and positioning it with its prongs in contact with the agar, etc. prepared surface, and (5) drying the agar surface with its biologicals, and (6) depositing on the dried surface the substance to be tested.

It can be readily seen that the container 11 once having been prepared and its holes 13 provided with dye and different biologicals and or testing elements can be used as a ready source of materials for a multiple number or series of different tests, and the dispensing element 12 by simply after being provided with dye and testing materials, can be positioned on the agar or any testing surface to prepare a surface for a multiple test.

It can be seen that the positioning of the prongs and the wells can be altered in such a manner that only one fit between the prongs and the wells is possible. This can easily be done by offsetting one of the prongs and wells from the symmetrical arrangement shown in device 10. Other arrangements or alignments can be made to provide the same effect.

It should be understood that while I have illustrated and described the preferred embodiment and one variation of my invention, I do not limit myself to the precise construction herein disclosed and the right is reserved to all changes and modifications coming within the scope of the invention as defined in any of the appended claims.

Having thus described my invention, what I claim as new and desire to secure my United States Letters Patent is:

1. A testing device for preparing substances for testing comprising a container and a dispensing element, said container having a plurality of wells and said dispensing element having a base and pins extending therefrom, the said pins being so located on the base that when the dispensing element is positioned on the container the pins fit into the wells.

2. A testing device as defined in claim 1 and having in addition, indicator marks on the container and a dispensing element to orient them together.

3. A method of substance testing comprising (1) depositing in a plurality of the wells of a container different testing bodies, (2) preparing a surface with growth media to form a prepared surface, (3) positioning a dispensing element said element having prongs thereon with its prongs in the wells of the container, (4) taking the dispensing element from the container and positioning it with its prongs in contact with the growth media comprising the prepared surface, (5) drying the prepared surface with its testing bodies, and (6) depositing on the dried surface the substance to be tested.

4. A method of substance testing comprising (1) depositing in a plurality of wells of the container different testing bodies and a dye in one of the wells, (2) preparing a surface with growth media, (3) orienting and positioning the dispensing element with its prongs in the wells of the container, (4) taking the dispensing element from the container and positioning it with its prongs in contact with the prepared surface, (5) drying the surface with its testing bodies, and (6) depositing on the dried surface the substance to be tested.

5. A method of substance testing comprising (1) depositing in a plurality of wells of the container different testing bodies, (2) positioning the dispensing element with its prongs in the wells of the container, (3) taking the dispensing element from the container and positioning it with its prongs on a testing surface, (4) drying the testing surface, (5) coating the testing surface growth media, (6) drying the testing surface, (7) coating the testing surface with the substance to be tested.

6. A method of substance testing comprising (1) depositing in a plurality of the wells of the container different testing bodies, (2) preparing a surface with growth media, (3) drying the said surface, (4) depositing on the dried surface the substance to be tested, (5) positioning the dispensing element with its prongs in the wells of the container, (6) taking the dispensing element from the container and positioning it with its prongs in contact with the agar and substance to be tested.

7. A method of substance testing comprising (1) preparing a surface with growth media, (2) drying the said surface, (3) depositing on the dried surface the substance to be tested, (4) depositing in a plurality of the wells of the container different testing bodies, (5) positioning the dispensing element with its prongs in the wells of the container, (6) taking the dispensing element from the container and positioning it with its prongs in contact with the growth media and substance to be tested.

8. A testing device for preparing substances for testing comprising a container and a dispensing element, said container having a plurality of depressions symmetrically located with at least one well unsymmetrically positioned and said dispensing element having a base and prongs extending therefrom, the said prongs being so located on the base so that when the dispensing element is positioned on the container the prongs fit into the depressions.

References Cited in the file of this patent

UNITED STATES PATENTS

| | | |
|---|---|---|
| 2,533,089 | Brewer et al. | Dec. 5, 1950 |
| 2,871,168 | Salisbury | Jan. 27, 1959 |

OTHER REFERENCES

Beadle et al.: Improvements in the Cylinder-Plate Method for Penicillin Assay, Journal of Bact., vol. 49, No. 1, January 1945, pp. 101–104.